(12) United States Patent
Inada et al.

(10) Patent No.: US 7,270,535 B2
(45) Date of Patent: Sep. 18, 2007

(54) DISC-MOLDING MOLD, MOLDED PRODUCT, MOLDING MACHINE AND DISK-SHAPED MEMBER

(75) Inventors: Yuichi Inada, Tokyo (JP); Yasuyoshi Sakamoto, Matsudo (JP); Katsuyuki Hiki, Matsudo (JP)

(73) Assignees: Sumitomo Heavy Industries, Ltd., Tokyo (JP); Seikoh Giken Co., Ltd., Chiba (JP)

( * ) Notice: Subject to any disclaimer, the term of this patent is extended or adjusted under 35 U.S.C. 154(b) by 0 days.

(21) Appl. No.: 10/517,140

(22) PCT Filed: Mar. 31, 2004

(86) PCT No.: PCT/JP2004/004740

§ 371 (c)(1),
(2), (4) Date: Dec. 7, 2004

(87) PCT Pub. No.: WO2005/099992

PCT Pub. Date: Oct. 27, 2005

(65) Prior Publication Data

US 2005/0220925 A1    Oct. 6, 2005

(51) Int. Cl.
*B29C 45/73* (2006.01)
*B29D 17/00* (2006.01)

(52) U.S. Cl. ..................... 425/552; 425/810

(58) Field of Classification Search ............... 425/547, 425/552, 810; 264/1.33, 106, 107
See application file for complete search history.

(56) References Cited

U.S. PATENT DOCUMENTS

2002/0058084 A1 * 5/2002 Sandstrom et al. ......... 425/547

FOREIGN PATENT DOCUMENTS

| JP | 7-178774 | 7/1995 |
|---|---|---|
| JP | 8-132498 | 5/1996 |
| JP | 10-626 | 1/1998 |
| JP | 2000-343562 | 12/2000 |
| JP | 2004-167979 | 6/2004 |

OTHER PUBLICATIONS

English abstract and computer translation of JP 10-000626, the reference dated Jan. 1998.*

* cited by examiner

*Primary Examiner*—Robert B. Davis
(74) *Attorney, Agent, or Firm*—Squire, Sanders & Dempsey L.L.P.

(57) ABSTRACT

An object is to provide a disc-molding mold which can increase the degree of transfer of a pattern of a stamper to thereby improve quality of molded products, as well as a molded product and a molding machine. In the vicinity of the outer peripheral edges of first and second disc-shaped members, the cooling capacity of the medium flow passage of the stamper-side disc-shaped member is made lower than the cooling capacity of the medium flow passage of the non-stamper-side disc-shaped member. On the stamper side, the quantity of heat radiated from the outer peripheral edge of the stamper-side disc-shaped member to the outside of the disc-molding mold can be reduced, whereby over-cooling of the stamper-side disc-shaped member can be prevented. As a result, a local deterioration in the degree of transfer, which would otherwise occur in the vicinity of the outer peripheral edge of the cavity space (C), can be prevented, and thus the degree of transfer of the fine pattern can be improved over the entire cavity space (C) As a result, quality of molded products can be improved.

11 Claims, 3 Drawing Sheets

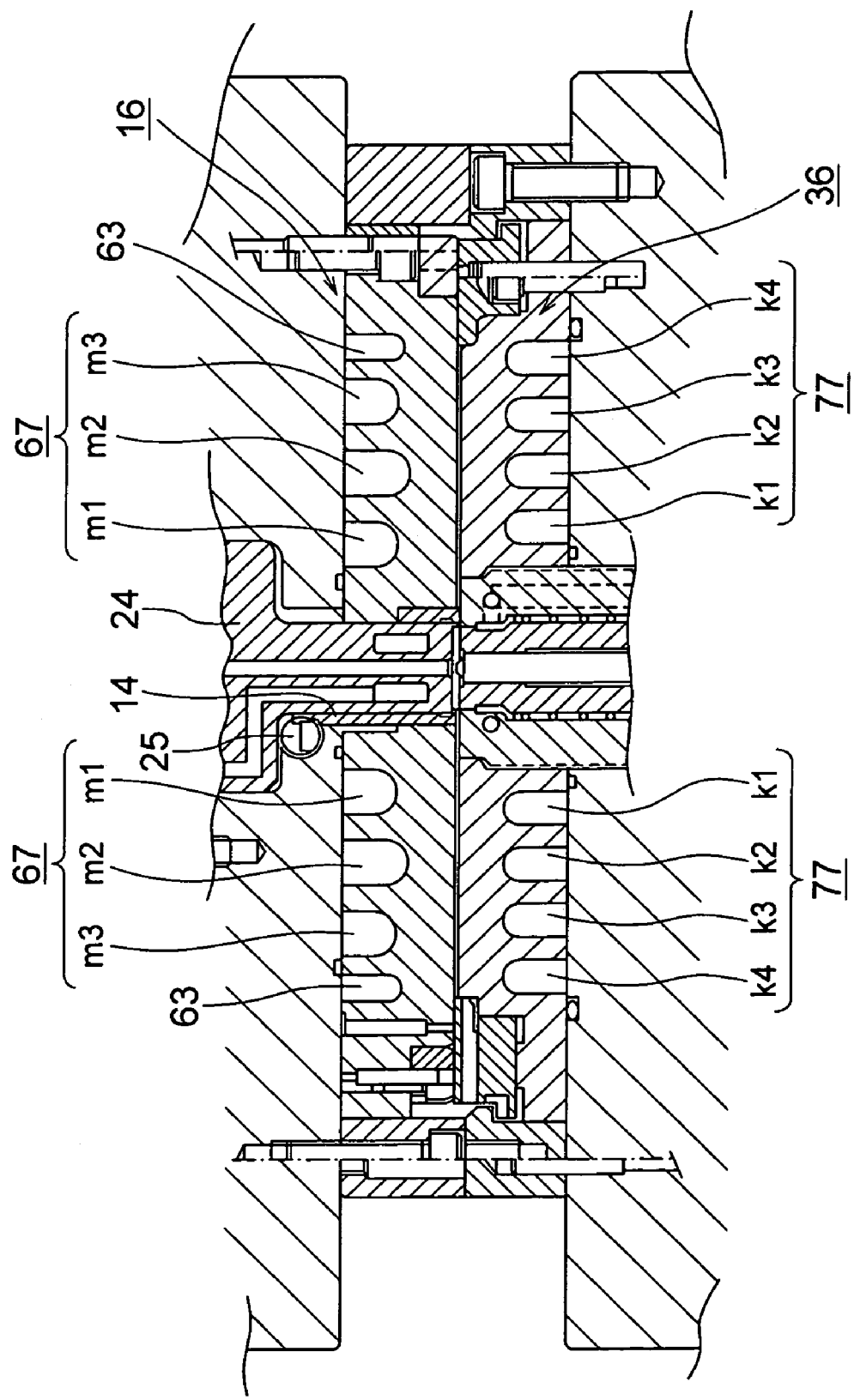

DISC-MOLDING MOLD, MOLDED PRODUCT, MOLDING MACHINE AND DISK-SHAPED MEMBER

TECHNICAL FIELD

The present invention relates to a disc-molding mold, a molded product, and a molding machine.

BACKGROUND ART

Conventionally, in a molding machine, such as an injection molding machine, for molding a product such as a disc substrate, resin melted within a heating cylinder is charged into a cavity space in a disc-molding mold, and is then cooled and hardened in the cavity space so as to obtain a disc substrate.

For such a molding process, the above-mentioned injection molding machine includes the disc-molding mold consisting of a stationary mold assembly and a movable mold assembly; an injection apparatus for charging resin into a cavity space; and a mold clamp apparatus for bringing the movable mold assembly into contact with the stationary mold assembly and separating the movable mold assembly from the stationary mold assembly. The mold clamp apparatus is operated so as to advance and retract the movable mold assembly to thereby close, clamp, and open the disc-molding mold. When the mold is clamped, a cavity space is formed between a mirror-surface disc of the stationary mold assembly and a mirror-surface disc of the movable mold assembly.

The injection apparatus includes a heating cylinder; an injection nozzle attached to a front end of the heating cylinder; and a screw disposed in the heating cylinder so that the screw can rotate and can advance and retract.

In a metering step, the screw is rotated, whereby resin is melted and accumulated in front of the screw, and the screw is retracted accordingly. During this period, the disc-molding mold is closed and clamped. Subsequently, in an injection step, the screw is advanced, whereby the resin accumulated in front of the screw is injected from the injection nozzle and charged into the cavity space. In a cooling step, the resin in the cavity space is cooled, and hole punching is performed, whereby a disc substrate is completed. Subsequently, the mold is opened, and the disc substrate is removed.

A stamper is attached to the stationary mirror-surface disc. Upon charging of the resin into the cavity space, a fine pattern of pits formed on the stamper is transferred to the resin, whereby an uneven surface is formed as an information surface of the disc substrate.

Meanwhile, a sprue is formed in a stationary-side sprue bush, and a front end of the sprue forms a gate serving as an inlet for resin to be charged into the cavity space. Resin passes through the sprue and the gate, and enters the cavity space, where the resin flows radially outward.

Therefore, a temperature gradient is formed in the cavity space, whereby the temperature of resin increases toward the gate and decreases toward the outer peripheral edge. As a result, the degree of transfer of the pattern of the stamper increases toward the gate and decreases toward the outer peripheral edge.

In view of the above, in the stationary mirror-surface disc, the distance between a medium flow passage for temperature control and a surface of the mirror-surface disc increases from the gate toward the outer peripheral edge, whereby a gradient is imparted to the cooling capacity of the temperature control in such a manner that the cooling capacity increases toward the gate and decreases toward the outer peripheral edge, whereby generation of a temperature gradient within the cavity space is suppressed.

However, in the conventional disc-molding mold, generation of a temperature gradient within the cavity space is suppressed; however, since the outer peripheral edge portion of the cavity space is located in the vicinity of the peripheral edge of the disc-molding mold, a large quantity of heat is radiated therefrom to the outside of the disc-molding mold, whereby the outer peripheral edge portion of the cavity space is cooled excessively.

As a result, the degree of transfer locally decreases in the vicinity of the outer peripheral edge of the cavity space, and quality of disc substrates is deteriorated.

An object of the present invention is to solve the above-mentioned problems in the conventional disc-molding mold and to provide a disc-molding mold which can increase the degree of transfer of a pattern of a stamper to thereby improve quality of molded products, as well as a molded product and a molding machine.

DISCLOSURE OF THE INVENTION

To achieve the above object, the present invention provides a disc-molding mold comprising a first support member; a first disc-shaped member attached to the first support member; a second support member; and a second disc-shaped member attached to the second support member, the second disc-shaped member facing the first disc-shaped member and forming a cavity space in cooperation with the first disc-shaped member when the disc-molding mold is clamped.

A medium flow passage for temperature control is formed in each of the first and second disc-shaped members; a stamper is removably attached to one of the first and second disc-shaped members; and in the vicinity of outer peripheral edges of the first and second disc-shaped members, the cooling capacity of the medium flow passage of the stamper-side disc-shaped member is lower than the cooling capacity of the medium flow passage of the non-stamper-side disc-shaped member.

In this case, in the vicinity of outer peripheral edges of the first and second disc-shaped members, the cooling capacity of the medium flow passage of the stamper-side disc-shaped member is lower than the cooling capacity of the medium flow passage of the non-stamper-side disc-shaped member. Therefore, on the stamper side, the quantity of heat radiated from the outer peripheral edge of the stamper-side disc-shaped member to the outside of the disc-molding mold can be reduced, whereby over-cooling of the stamper-side disc-shaped member can be prevented. Therefore, a local deterioration in the degree of transfer, which would otherwise occur in the vicinity of the outer peripheral edge of the cavity space, can be prevented, and thus the degree of transfer of the fine pattern can be improved over the entire cavity space. As a result, quality of molded products can be improved.

In another disc-molding mold according to the present invention, a heat insulating section is formed in the stamper-side disc-shaped member in the vicinity of the outer peripheral edge thereof.

In still another disc-molding mold according to the present invention, the heat insulating section is formed along a line corresponding to the outer peripheral edge of the stamper.

In still another disc-molding mold according to the present invention, the heat insulating section is formed by a closed chamber filled with air.

In still another disc-molding mold according to the present invention, the closed chamber is formed in an annular shape.

In still another disc-molding mold according to the present invention, the heat insulating section is formed by a closed chamber filled with a heat insulating material.

In still another disc-molding mold according to the present invention, the closed chamber is deeper than the medium passage.

In this case, since the closed chamber is deeper than the medium passage, the quantity of heat radiated from the outer peripheral edge of the stamper-side disc-shaped member to the outside of the disc-molding mold is further reduced, whereby over-cooling of the stamper-side disc-shaped member can be prevented without fail.

In still another disc-molding mold according to the present invention, the medium flow passage is formed of a single continuous flow passage.

In still another disc-molding mold according to the present invention, the medium passage of the non-stamper-side disc-shaped member has a greater depth at a portion corresponding to the heat insulating section, as compared with the remaining portions.

In this case, since the medium passage of the non-stamper-side disc-shaped member has a greater depth at a portion corresponding to the heat insulating section as compared with the remaining portions, on the non-stamper side, the temperature of resin does not increase excessively in the vicinity of the outer peripheral edge. Accordingly, a large temperature difference is not produced between a high-temperature portion and a low-temperature portion of a disc substrate when it is removed after the mold is opened, whereby a difference in shrinkage percentage is not produced between the high-temperature portion and a low-temperature portion. As a result, the disc substrate can have an even thickness.

A molded product according to the present invention is molded by use of the disc-molding mold.

A molding machine according to the present invention is equipped with the disc-molding mold.

BRIEF DESCRIPTION OF THE DRAWINGS

FIG. 3 is an enlarged view showing a main portion of the disc-molding mold according to the embodiment of the present invention.

BEST MODE FOR CARRYING OUT THE INVENTION

An embodiment of the present invention will next be described in detail with reference to the drawings.

Figure 1:
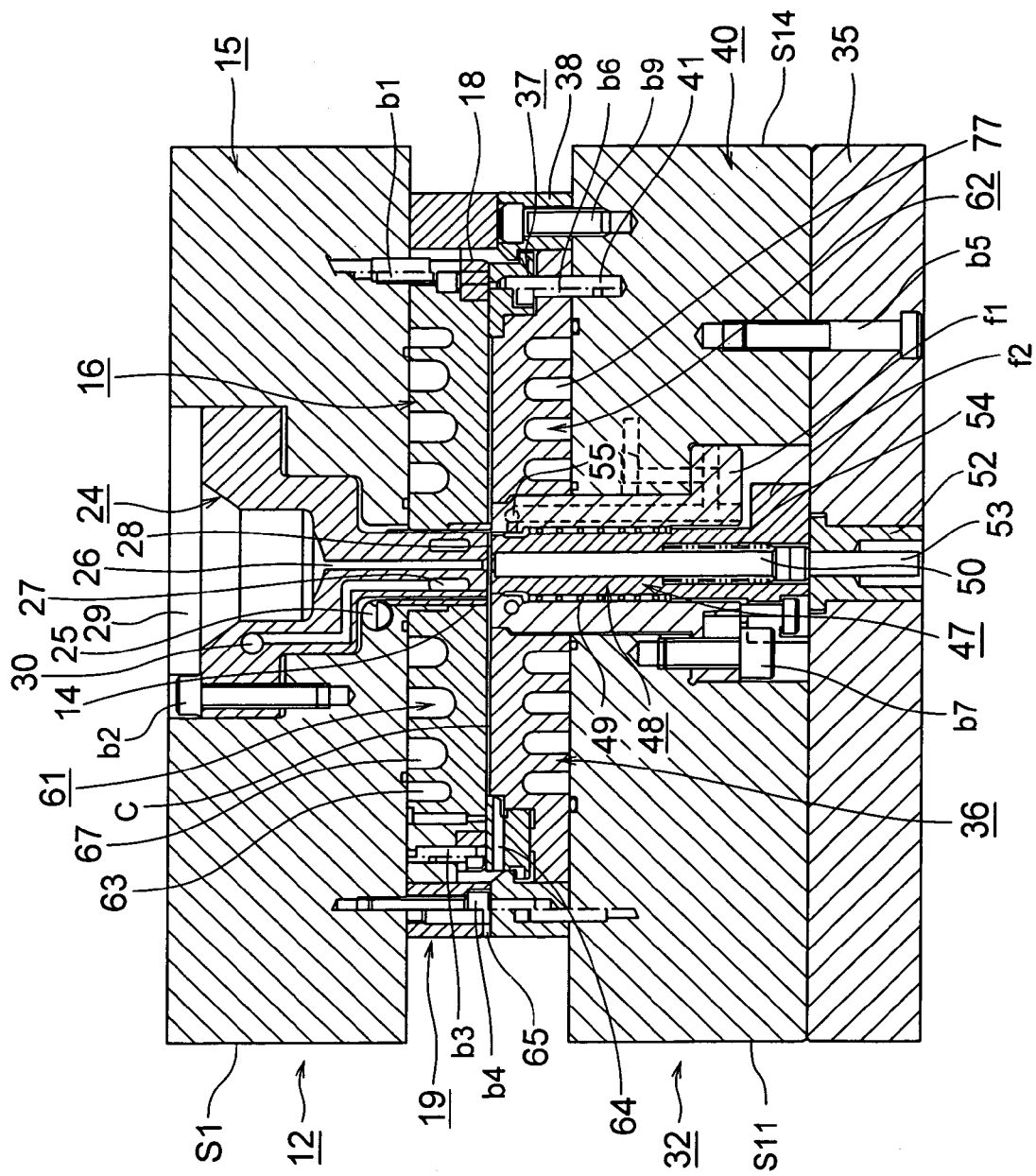
FIG. 1 is a sectional view showing a main portion of a disc-molding mold according to an embodiment of the present invention.
Figure 2:
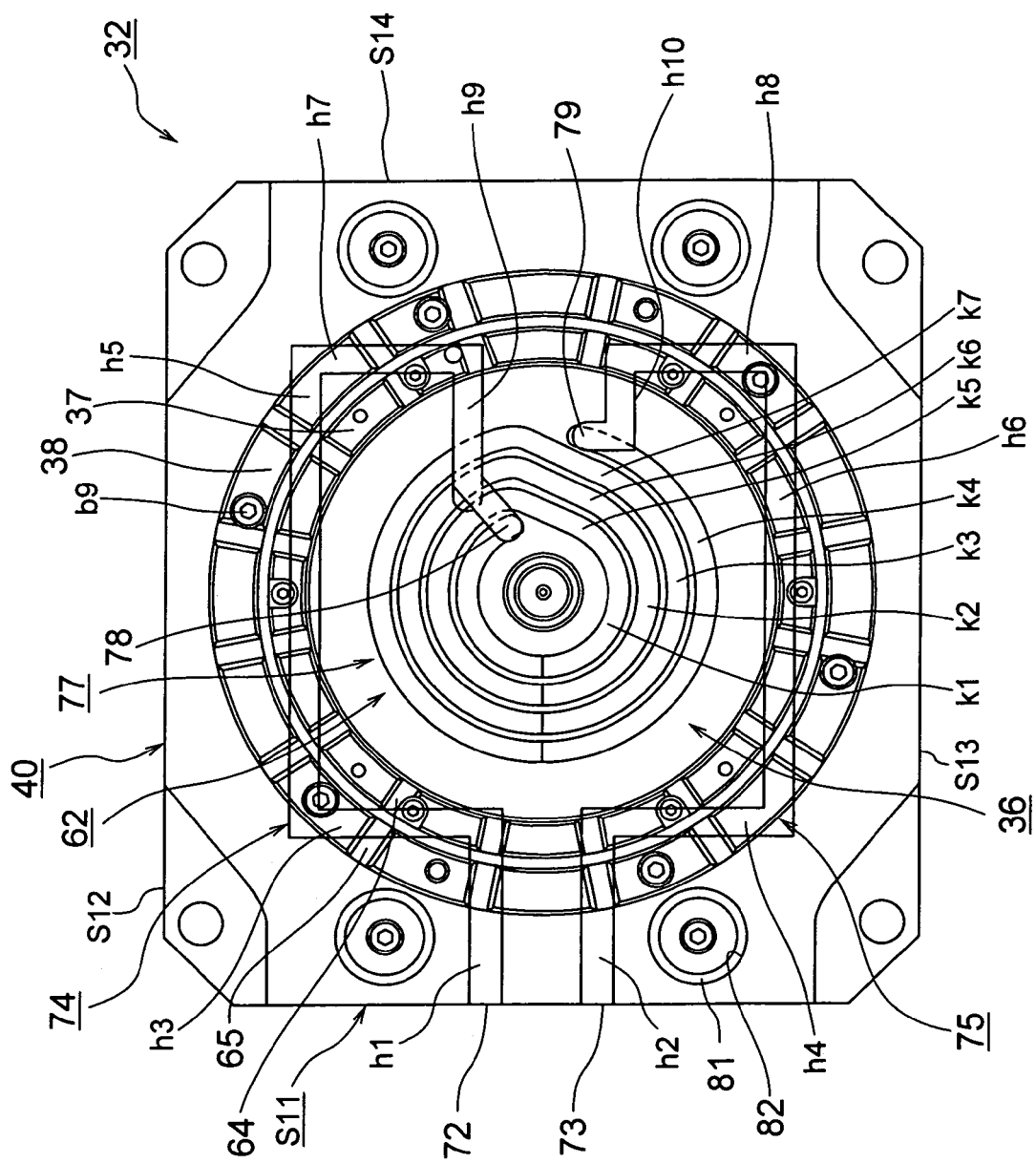
FIG. 2 is a front view showing a main portion of a movable mold assembly according to the embodiment of the present invention.

FIG. 1 is a sectional view showing a main portion of the disc-molding mold according to the embodiment of the present invention; FIG. 2 is a front view showing a main portion of a movable mold assembly according to the embodiment of the present invention; and FIG. 3 is an enlarged view showing a main portion of the disc-molding mold according to the embodiment of the present invention.

In the drawings, reference numeral 12 denotes a stationary mold assembly that is attached to an unillustrated stationary platen via an unillustrated mount plate and by use of unillustrated bolts. The stationary mold assembly 12 is composed of a base plate 15 serving as a first support member; a mirror-surface disc 16 serving as a first disc-shaped member and attached to the base plate 15 by use of bolts b1; and a sprue bush 24 disposed within the base plate 15 to be positioned with respect thereto and attached to the base plate 15 by use of bolts b2. A concave portion serving as a die 28 is formed at a front end (a lower end in FIG. 1) of the sprue bush 24 to face a cavity space C; and a concave portion serving as a nozzle contact portion 29 is formed at a rear end (an upper end in FIG. 1) of the sprue bush 24. An injection nozzle of an unillustrated injection apparatus comes into contact with the nozzle contact portion 29. A sprue 26 is formed in the sprue bush 24 in such a manner that the sprue 26 extends between a front end and a rear end thereof, and the sprue 26 communicates with the die 28 and the nozzle contact portion 29, to thereby allow passage of resin, serving as a molding material, injected from the injection nozzle. The front end of the sprue 26 constitutes a gate serving as an inlet for resin to be charged into the cavity space C.

An annular medium flow passage 27 for temperature control is formed in the vicinity of the die 28, and a temperature control medium such as water, oil, or air is supplied from an unillustrated medium supply source to the medium flow passage 27 via a supply passage 30, whereby the sprue bush 24 (in particular, a front end portion (a lower end portion in FIG. 1) of the sprue bush 24) is cooled to a predetermined temperature, along with an inner stamper holder 14, which is disposed to surround a front half (a lower half in FIG. 3) of the sprue bush 24 and is adapted to press and hold an inner circumferential edge of an unillustrated stamper. The inner stamper holder 14 is engaged with and disengaged from the base plate 15 through rotation of a rod 25, which is rotatably disposed to face a rear end of the inner stamper holder 14.

Notably, the above-mentioned injection apparatus includes a heating cylinder; an injection nozzle attached to a front end of the heating cylinder; and a screw disposed in the heating cylinder in such a manner as to be able to rotate and to advance and retract.

The above-mentioned stamper is removably attached to the mirror-surface disc 16. Upon charging of resin into the cavity space C, a fine pattern of pits formed on the stamper is transferred to the resin, whereby an uneven surface is formed as an information surface of the disc substrate, which is a molded product.

Moreover, an annular abutment ring 18 is attached to an outer peripheral edge of the mirror-surface disc 16 by use of bolts b3. A first outer ring 19 of annular shape is disposed on the radially outer side of the mirror-surface disc 16 and the abutment ring 18, and is attached to the base plate 15 by use of bolts b4.

Meanwhile, reference numeral 32 denotes a movable mold assembly that is attached to an unillustrated movable platen by use of unillustrated bolts. The movable mold assembly 32 is advanced and retracted (moved vertically in FIG. 1) as the result of advancement and retraction of the movable platen, whereby the movable mold assembly 32 is brought into contact with the stationary mold assembly 12 and separated therefrom.

The movable mold assembly 32 is composed of a base plate 35; an intermediate plate 40 attached to the base plate 35 by use of bolts b5; a mirror-surface disc 36 serving as a second disc-shaped member and attached to the intermediate plate 40 by use of bolts b6; a tubular bush 47 disposed in the intermediate plate 40 and attached thereto by use of bolts b7; a tubular cut punch 48 disposed within the bush 47 via a bearing 49, which serves as a linear bearing portion, in such a manner that the cut punch 48 can advance and retract; an ejection pin 50 disposed within the cut punch 48 in such a manner that it can advance and retract; a cut punch block 52 disposed in the base plate 35; and an ejection rod 53 disposed in the base plate 35 to penetrate the cut punch block 52 and to be slidable with respect to the cut punch block 52. Notably, the base plate 35 and the intermediate plate 40 constitute a second support member.

In the present embodiment, the stamper is attached to the mirror-surface disc 16. However, the stamper may be attached to the mirror-surface disc 36.

The bush 47 is disposed in such a manner that its front end (an upper end in FIG. 1) faces the cavity space C. The bush 47 extends rearward (downward in FIG. 1) through the mirror-surface disc 36 and is mounted, at its flange portion f1 at the rear end (the lower end in FIG. 1), to the intermediate plate 40 by use of the bolts b7. A small clearance is formed between an outer circumferential surface of the bush 47 and inner circumferential surfaces of the mirror-surface disc 36 and the intermediate plate 40. Compressed air is supplied to the clearance, and the air is injected into the cavity space C from an air blow slit formed at the front ends of the bush 47 and the mirror-surface disc 36.

The cut punch 48 is disposed in such a manner that its front end faces the cavity space C. The cut punch 48 extends rearward through the mirror-surface disc 36 and the intermediate plate 40, and its rear end flange portion f2 abuts the cut punch block 52. Therefore, upon drive of an unillustrated cut punch cylinder serving as a cut punch drive section, the cut punch block 52 can be advanced and retracted, whereby the cut punch 48 can be advanced and retracted. The front end of the cut punch 48 has a shape corresponding to that of the die 28. Upon advancement (upward movement in FIG. 1) of the cut punch 48, the front end of the cut punch 48 can be inserted into the die 28.

An annular flow passage 55 for cooling is formed in the front end portion of the bush 47, and air is supplied from an unillustrated air supply source to the flow passage 55, whereby the cut punch 48 (in particular, a front end portion (an upper end portion in FIG. 1) of the cut punch 48) is cooled to a predetermined temperature, and the bush 47 is cooled.

The ejection pin 50 is disposed in such a manner that its front end faces the cavity space C. The ejection pin 50 extends rearward through the mirror-surface disc 36 and the intermediate plate 40, and its rear end abuts the ejection rod 53. Therefore, upon drive of an unillustrated ejection cylinder serving as an ejection drive section, the ejection rod 53 can be advanced and retracted, whereby the ejection pin 50 can be advanced and retracted. A spring 54 serving as an urging member is disposed to extend between the cut punch 48 and the ejection pin 50, so that the ejection pin 50 is urged rearward with a predetermined urging force.

An annular cavity ring 37 is disposed at an outer peripheral edge portion of the mirror-surface disc 36 in such a manner that the cavity ring 37 can move relative to the mirror-surface disc 36, and faces the abutment ring 18. A second outer ring 38 of an annular shape is disposed on the radially outer side of the mirror-surface disc 36 and the cavity ring 37 so as to face the first outer ring 19, and is attached to the intermediate plate 40 by use of bolts b9. The second outer ring 38 also functions as a cavity ring holder and is engaged with an outer peripheral edge of the cavity ring 37.

Guide rods 41 are attached to the cavity ring 37 and extend rearward. The cavity ring 37 can be advanced and retracted through advancement and retraction of the guide rods 41 along guide holes formed in the intermediate plate 40. The cavity ring 37 projects from a front end surface (an upper end surface in FIG. 1) of the mirror-surface disc 36, so that an outer peripheral edge of a disc substrate is formed by an inner circumferential surface of the cavity ring 37.

The cavity ring 37 has a plurality of thin vent holes 64 which are radially formed in the vicinity of a front end surface of the cavity ring 37 at uniform angular intervals. Moreover, the first outer ring 19 has a plurality of vent grooves 65 which are radially formed on a front end surface of the first outer ring 19 at uniform angular intervals in such a manner that the vent grooves 65 communicate with the corresponding thin holes 64 (for easy understanding, in FIG. 2, the thin holes 64 are illustrated as being on the front end surface of the second outer ring 38). Notably, the thin holes 64 constitute a first gas passage, and the grooves 65 constitute a second gas passage.

The mold assemblies 12 and 32 constitute a disc-molding mold; and an unillustrated mold clamp apparatus is disposed so as to bring the mold assembly 32 into contact with the mold assembly 12 and separate the same from the mold assembly 12. The mold assembly 32 is advanced and retracted upon drive of a clamp cylinder, serving as a mold clamping drive section of the mold clamp apparatus, whereby the disc-molding mold can be closed, clamped, and opened. When the disc-molding mold is clamped, the above-mentioned cavity space C is formed between the mirror-surface discs 16 and 36. In order to enable smooth mold closing and opening, unillustrated guide rods are attached to the base plate 15 at predetermined locations in such a manner that the guide rods project toward the mold assembly 32. Guide bushes 81 are disposed in the intermediate plate 40 and the base plate 35 at locations corresponding to the guide rods. With advancement and retraction of the mold assembly 32, the guide rods move axially with respect to the guide bushes 81. Notably, in FIG. 2, reference numeral 82 denotes a guide bush hole for accommodating the guide bush 81.

In a cooling step, the cut punch 48 is advanced through drive of the cut punch cylinder, whereby the front end of the cut punch 48 enters the die 28 so as to punch a hole in the resin within the cavity space C.

In the injection molding machine having the above-described structure, in a metering step, the screw of the above-mentioned injection apparatus is rotated, whereby resin is melted and accumulated in front of the screw, and the screw is retracted accordingly. During this period, the disc-molding mold is closed and clamped. Subsequently, in an injection step, the screw is advanced, whereby the resin accumulated in front of the screw is injected from the injection nozzle and charged into the cavity space C. In a cooling step, the resin in the cavity space C is cooled, and hole punching is performed, whereby a disc substrate is completed. Subsequently, the mold is opened, and the disc substrate is removed.

In the injection step, the resin passes through the sprue 26 and then the gate to enter the cavity space C, and then flows radially outward within the cavity space C. Therefore, a temperature gradient is formed in the cavity space C, whereby the temperature of the resin increases toward the gate and decreases toward the outer peripheral edge. In such a case, the degree of transfer of the pattern of the stamper increases toward the gate and decreases toward the outer peripheral edge.

In view of the above, in order to prevent generation of a temperature gradient within the cavity space C, the mirror-surface discs 16 and 36, the base plate 15, and the intermediate plate 40 form first and second medium flow passages 61 and 62 for temperature control. A temperature control medium such as water, oil, or air is supplied from the above-mentioned medium supply source to the first and second medium flow passages 61 and 62 so as to cool the mirror-surface discs 16 and 36 to a predetermined temperature.

The first medium flow passage 61 includes an unillustrated medium inlet opened to a predetermined location on the base plate 15; e.g., to a side surface S1, which is located at a lower side (left side in the drawings) when the disc-molding mold is attached to an injection molding machine; an unillustrated medium outlet which is opened to the side surface S1 adjacent to the medium inlet; unillustrated inlet-side and outlet-side auxiliary cooling portions formed within the base plate 15 so as to cool mainly the base plate 15 and connected to the medium inlet and outlet, respectively; a main cooling portion 67 formed in a predetermined pattern between the mirror-surface disc 16 and the base plate 15 so as to cool mainly the mirror-surface disc 16; and inlet-side and outlet-side connection portions for connecting the auxiliary cooling portions and the main cooling portion 67. The main cooling portion 67 is formed by covering a groove opened to a rear end surface (upper end surface in FIG. 1) of the mirror-surface disc 16 with the base plate 15, and constitutes a single continuous closed flow passage.

Similarly, the second medium flow passage 62 includes a medium inlet 72 opened to a predetermined location on the intermediate plate 40; e.g., to a side surface S11, which is located at a lower side when the disc-molding mold is attached to the injection molding machine; a medium outlet 73 which is opened to the side surface S11 adjacent to the medium inlet 72; inlet-side and outlet-side auxiliary cooling portions 74 and 75 formed within the intermediate plate 40 so as to cool mainly the intermediate plate 40 and connected to the medium inlet and outlet 72 and 73, respectively; a main cooling portion 77 formed in a predetermined pattern between the mirror-surface disc 36 and the intermediate plate 40 so as to cool mainly the mirror-surface disc 36; and inlet-side and outlet-side connection portions 78 and 79 for connecting the auxiliary cooling portions 74 and 75 to the main cooling portion 77. The main cooling portion 77 is formed by covering a groove opened to a rear end surface (lower end surface in FIG. 1) of the mirror-surface disc 36 with the intermediate plate 40, and constitutes a single continuous closed flow passage.

The auxiliary cooling portions 74 and 75 are formed on the radially outer side of the main cooling portion 77 so as to surround the main cooling portion 77. The auxiliary cooling portions 74 and 75 have parallel flow passage portions h1 and h2 which extend straight from the medium inlet 72 and the medium inlet 73 toward the interior of the intermediate plate 40; flow passage portions h3 and h4 which extend straight and perpendicularly from distal ends of the flow passage portions h1 and h2 toward a rear-side (a non-operation-side) side surface S12 and a front-side (an operation-side) side surface S13, respectively; parallel flow passage portions h5 and h6 which extend straight and perpendicularly from distal ends of the flow passage portions h3 and h4 along respective side edges of the intermediate plate 40 toward an upper-side side surface S14; flow passage portions h7 and h8 which extend straight and perpendicularly from distal ends of the flow passage portions h5 and h6 in mutually approaching directions; and parallel flow passage portions h9 and h10 which extend straight and perpendicularly from distal ends of the flow passage portions h7 and h8 toward the connection portions 78 and 79, respectively. Notably, the auxiliary cooling portions formed in the base plate 15 have structures similar to those of the auxiliary cooling portions 74 and 75.

The main cooling portion 77 includes a plurality of portions formed concentrically and successively from the center of the intermediate plate 40 toward the radially outer side so as to extend over a predetermined angle θ; i.e., arcuate portions k1 to k4, as well as a straight portion k5 for connecting the arcuate portions k1 and k2, a straight portion k6 for connecting the arcuate portions k2 and k3, and a straight portion k7 for connecting the arcuate portions k3 and k4. The connection portion 78 is connected to the arcuate portion k1, and the connection portion 79 is connected to the arcuate portion k4. Although the main cooling portion 67 formed in the mirror-surface disc 16 has portions similar to those of the main cooling portion 77; i.e., consists of arcuate portions m1 to m3 and unillustrated straight portions, the number of the arcuate portions m1 to m3 is three, and the number of the straight portions is two.

Therefore, the medium supplied to the interior of the intermediate plate 40 via the medium inlet 72 flows through the auxiliary cooling portion 74, and then moves to the interior of the mirror-surface disc 36 and flows through the second medium flow passage 62. Subsequently, the medium returns to the interior of the intermediate plate 40 and flows through the auxiliary cooling portion 75, and then is discharged from the medium outlet 73.

Incidentally, since an outer peripheral edge portion of the cavity space is located near the outer peripheral edge of the disc-molding mold, an excessive quantity of heat is radiated to the outside of the disc-molding mold, and the outer peripheral edge portion of the cavity space is excessively cooled.

In view of the above, in order to prevent over-cooling of resin in the vicinity of the outer peripheral edge of the stamper-side mirror-surface disc 16, a closed chamber 63 of a predetermined shape (annular shape in the present embodiment), which serves as a heat insulating section, is formed on a predetermined location on the radially outer side of the first medium flow passage 61 (along a line corresponding to the outer peripheral edge of the stamper). The closed chamber 63 is filled with air. Like the main cooling portion 67, the closed chamber 63 is formed by covering a groove opened to the rear end surface of the mirror-surface disc 16 with the base plate 15, and is made deeper than the main cooling portion 67.

Since the closed chamber 63 filled with air has a heat insulating property, the closed chamber 63 prevents transmission of heat from the radially inner side of the closed chamber 63 to the radially outer side thereof. Therefore, the cooling capacity of the first medium flow passage 61 is made lower than that of the second medium flow passage 62. Thus, on the stamper side, the quantity of heat radiated from the outer peripheral edge of the mirror-surface disc 16 to the outside of the disc-molding mold is reduced, whereby over-cooling of the outer peripheral edge portion of the mirror-surface disc 16 can be prevented. As a result, a local deterioration in the degree of transfer, which would otherwise occur in the vicinity of the outer peripheral edge of the cavity space C, can be prevented, and thus the degree of transfer of the fine pattern can be improved over the entire cavity space C. Thus, quality of disc substrates can be improved.

Since the closed chamber 63 is rendered deeper than the main cooling portion 67, the quantity of heat radiated from the outer peripheral edge of the mirror-surface disc 16 to the outside of the disc-molding mold can be further reduced, whereby over-cooling of the outer peripheral edge portion of the mirror-surface disc 16 can be prevented without fail.

In the present embodiment, the closed chamber 63 filled with air is formed as a heat insulating section. However, in place of the closed chamber 63, a vacuum closed chamber may be formed. Further, a material having a high heat insulating performance; i.e., a heat insulating material, may be charged in the closed chamber 63.

In the present embodiment, the closed chamber 63 has an annular shape. However, a plurality of arcuate closed chambers may be formed along the circumferential direction of the mirror-surface disc 16. In the present embodiment, the closed chamber 63 is formed in the mirror-surface disc 16. However, the closed chamber 63 may be formed in the mirror-surface disc 36 or both of the mirror-surface disc 16 and the mirror-surface disc 36.

Notably, the depth of the groove which forms the main cooling portion 67 (the distance between the opening portion and the bottom portion of the groove) is set as shown by the solid line in FIGS. 1 and 3; i.e., the arcuate portion m2 is set deeper than the arcuate portions m1 and m3, whereby the cooling capacity in the vicinity of the inner stamper holder 14 and that in the vicinity of the closed chamber 63 are rendered lower than that at a central portion.

Incidentally, when resin is excessively cooled when it flows from the gate into the cavity space C, molecules of the resin are stretched and are aligned in the same direction. As a result, the birefringence at the inner circumferential edge of a disc substrate increases, and quality deteriorates. In view of this, as described above, the innermost arcuate portion m1 is rendered shallower than the arcuate portion m2 so as to lower its cooling capacity.

If necessary, as illustrated by a broken line in FIGS. 1 to 3, the depths of the arcuate portions m1 and m2 may be made substantially equal to each other. Moreover, the depths of the arcuate portions m1 to m3 may be made substantially equal to one another. Notably, the closed chamber 63 is made deeper than the arcuate portions m1 to m3.

Incidentally, on the stamper side; i.e. the side of the mirror-surface disc 16 where the stamper is disposed and which closely relates to the degree of transfer, formation of the closed chamber 63 prevents a local deterioration in the degree of transfer in the vicinity of the outer peripheral edge of the cavity space C. However, on the non-stamper side; i.e. the side of the mirror-surface disc 36 where the stamper is not disposed and which does not relate to the degree of transfer, the temperature excessively increases in the vicinity of the outer peripheral edge of the mirror-surface disc 36. When the temperature of resin increases excessively in the vicinity of the outer peripheral edge on the non-stamper side, a large temperature difference is produced between a high-temperature portion and a low-temperature portion of a disc substrate when it is removed after the mold is opened, whereby a difference in shrinkage percentage is produced between the high-temperature portion and a low-temperature portion. As a result, the disc substrate becomes thinner in the vicinity of the outer peripheral edge than in the vicinity of the gate, whereby the thickness becomes uneven.

In view of the above, the depth of the groove which forms the main cooling portion 77 is set as shown by the solid line in FIGS. 1 and 3; i.e., the arcuate portion k4 formed at a position corresponding to the closed chamber 63 is made deeper than the arcuate portions k1 to k3, whereby the cooling capacity of the arcuate portion k4 is enhanced.

Therefore, on the non-stamper side, the temperature of resin does not increase excessively in the vicinity of the outer peripheral edge, and therefore a large temperature difference is not produced between a high-temperature portion and a low-temperature portion of a disc substrate when it is removed after the mold is opened, whereby a difference in shrinkage percentage is not produced between the high-temperature portion and a low-temperature portion. As a result, the thickness of the disc substrate can be made uniform, and quality of the disc substrate can be improved.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention can be utilized in disc substrate manufacturing apparatuses for manufacturing disc substrates.

The invention claimed is:

1. A disc-molding mold characterized by comprising:
   (a) a first support member;
   (b) a first disc-shaped member attached to the first support member;
   (c) a second support member; and
   (d) a second disc-shaped member attached to the second support member, the second disc-shaped member facing the first disc-shaped member and forming a cavity space in cooperation with the first disc-shaped member when the disc-molding mold is clamped, wherein
   (e) a medium flow passage for temperature control is formed in each of the first and second disc-shaped members;
   (f) a stamper is removably attached to one of the first and second disc-shaped members; and
   (g) in the vicinity of outer peripheral edges of the first and second disc-shaped members, a heat insulating section is formed in the stamper-side disc-shaped member, on a predetermined location on the radially outer side of the medium flow passage, and thereon the cooling capacity of the medium flow passage of the stamper-side disc-shaped member is lower than the cooling capacity of the medium flow passage of the non-stamper-side disc-shaped member.

2. A disc-molding mold according to claim 1, wherein the heat insulating section is formed along a line corresponding to the outer peripheral edge of the stamper.

3. A disc-molding mold according to claim 1, wherein the heat insulating section is formed by a closed chamber filled with air.

4. A disc-molding mold according to claim 3, wherein the closed chamber is formed in an annular shape.

5. A disc-molding mold according to claim 1, wherein the heat insulating section is formed by a closed chamber filled with a heat insulating material.

6. A disc-molding mold according to claim 3, wherein the closed chamber is deeper than the medium passage.

7. A disc-molding mold according to claim 1, wherein the medium flow passage is formed of a single continuous flow passage.

8. A disc-molding mold according to claim 1, wherein the medium passage of the non-stamper-side disc-shaped member has a greater depth at a portion corresponding to the heat insulating section, as compared with the remaining portions.

9. A molding machine equipped with the disc-molding mold according to claim 1.

10. A stamper-side disc-shaped member for disk-molding mold comprising a first support member; a first disc-shaped member attached to the first support member a second support member; and a second disc-shaped member attached to the second support member, the second disc-shaped member facing the first disc-shaped member and forming a cavity space in cooperation with the first disc-shaped member when the disc-molding mold is clamped, wherein a medium flow passage for temperature control is formed in each of the first and second disc-shaped members; and a stamper is removably attached to one of the first and second disc-shaped members; and a heat insulating section is formed in the stamper-side disc-shaped member on the outer side of the medium flow passage so that in the vicinity of outer peripheral edges of the stamper-side disc-shaped member, the cooling capacity of the medium flow passage of the stamper-side disc-shaped member is lower than the cooling capacity of the medium flow passage of the non-stamper-side disc-shaped member.

11. A stamper-side disc-shaped member for disk-molding mold according to claim 10, wherein the heat insulating section on the outer side of the medium flow passage is formed by a closed chamber filled with air.

* * * * *